United States Patent
Wissemborski et al.

(10) Patent No.: US 10,023,465 B2
(45) Date of Patent: Jul. 17, 2018

(54) DOPED COPPER-II-HYDROXIDE PHOSPHATE, METHOD FOR PRODUCING SAME AND USE THEREOF

(71) Applicant: Chemische Fabrik Budenheim KG, Budenheim (DE)

(72) Inventors: Rüdiger Wissemborski, Gau-Algesheim (DE); Esther Sauer, Mainz (DE); Rainer Schnee, Mainz (DE); Moritz Fichtmüller, Oberursel (DE); Robert Vogt, Freiburg (DE); David Kümmet, Budenheim (DE)

(73) Assignee: Chemische Fabrik Budenheim KG, Budenheim (DE)

( * ) Notice: Subject to any disclaimer, the term of this patent is extended or adjusted under 35 U.S.C. 154(b) by 71 days.

(21) Appl. No.: 15/035,624

(22) PCT Filed: Nov. 3, 2014

(86) PCT No.: PCT/EP2014/073509
§ 371 (c)(1),
(2) Date: May 10, 2016

(87) PCT Pub. No.: WO2015/067545
PCT Pub. Date: May 14, 2015

(65) Prior Publication Data
US 2016/0280544 A1    Sep. 29, 2016

(30) Foreign Application Priority Data

Nov. 11, 2013 (DE) .......... 10 2013 112 387

(51) Int. Cl.
B32B 5/16 (2006.01)
C01B 25/37 (2006.01)
(Continued)

(52) U.S. Cl.
CPC ............ *C01B 25/37* (2013.01); *C01B 25/375* (2013.01); *C01G 3/006* (2013.01); *C08K 3/32* (2013.01);
(Continued)

(58) Field of Classification Search
CPC .................. C08K 3/32; B82Y 30/00
(Continued)

(56) References Cited

U.S. PATENT DOCUMENTS 4,567,220 A    1/1986 Schuler et al.
5,053,440 A    10/1991 Schueler et al.
(Continued)

FOREIGN PATENT DOCUMENTS

CN    1886450 A    12/2006
CN    102341448 A    2/2012
(Continued)

OTHER PUBLICATIONS

Chinese Office Action dated Dec. 8, 2016 issued in corresponding Chinese patent application No. 201480061488.7 (9 pages) and its English-language translation thereof (13 pages).

*Primary Examiner* — Khanh T Nguyen

(74) *Attorney, Agent, or Firm* — Drinker Biddle & Reath LLP

(57) ABSTRACT

A mixed-metallic phosphate compound is disclosed, which contains as the main metal copper in the divalent oxidation state in a proportion of at least 90.0 at-% and one or more doping metals in a total proportion of the doping metals of at least 0.01 to at most 10.0 at-%, wherein the doping metals are selected from the group consisting of the elements of the first and second main groups and the eighth subgroup of the elements of the periodic table, Al, Sn, Si, Bi, Cr, Mo, Mn, and the lanthanides. The stated metal proportions relate to the total amount of the metals in the mixed-metallic phos- (Continued)

Figure 1:
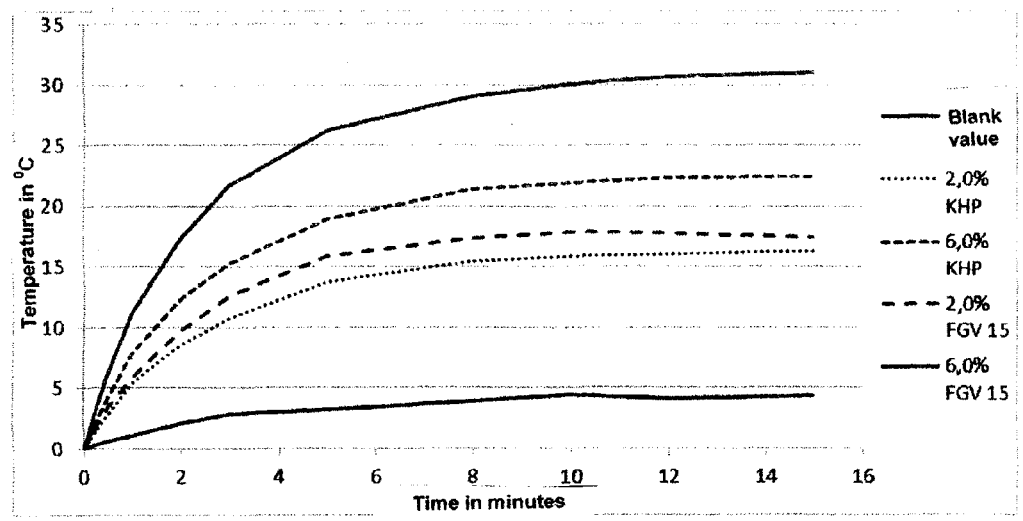

phate compound. The mixed-metallic compound has a phosphate content expressed as $P_2O_5$ in the range of 10 to 60 wt-%. Also disclosed is a method for producing the mixed-metallic phosphate compound and the use thereof.

11 Claims, 1 Drawing Sheet

(51) Int. Cl.
*C01G 3/00* (2006.01)
*C08K 3/32* (2006.01)
*C09K 5/14* (2006.01)
*H05B 1/02* (2006.01)
*H05B 3/00* (2006.01)

(52) U.S. Cl.
CPC ............ *C09K 5/14* (2013.01); *H05B 1/0247* (2013.01); *H05B 3/0038* (2013.01); *C01P 2002/52* (2013.01); *C01P 2002/82* (2013.01); *C01P 2002/84* (2013.01); *C01P 2006/60* (2013.01); *C08K 2003/328* (2013.01)

(58) Field of Classification Search
USPC .......................................... 524/398; 428/328
See application file for complete search history.

(56) References Cited

U.S. PATENT DOCUMENTS

| | | |
|---|---|---|
| 5,830,568 A | 11/1998 | Kondo |
| 7,258,923 B2 | 8/2007 | van den Bogerd et al. |
| 8,759,409 B2 | 6/2014 | Kummet et al. |
| 2007/0155881 A1* | 7/2007 | Hirthe ................. C08K 3/32 524/398 |
| 2009/0124735 A1 | 5/2009 | Futterer et al. |
| 2012/0082834 A1 | 4/2012 | Wermter et al. |
| 2012/0183763 A1* | 7/2012 | Ito ..................... B82Y 30/00 428/328 |
| 2013/0065979 A1 | 3/2013 | Kummet et al. |
| 2015/0001446 A1 | 1/2015 | Buehler et al. |

FOREIGN PATENT DOCUMENTS

| | | |
|---|---|---|
| CN | 102939330 A | 2/2013 |
| DE | 3342292 A1 | 5/1985 |
| DE | 3917294 A1 | 11/1990 |
| DE | 4136994 A1 | 5/1993 |
| DE | 19905358 A1 | 8/2000 |
| DE | 10 2004 050 478 A1 | 4/2006 |
| DE | 10 2009 001 335 A1 | 9/2010 |
| DE | 10 2010 003 366 A1 | 9/2011 |
| DE | 10 2011 056 812 A1 | 6/2013 |
| SU | 512169 A1 | 4/1976 |
| UA | 92634 C2 | 11/2010 |
| WO | WO-03/033582 A1 | 4/2003 |
| WO | WO-2005/052049 A1 | 6/2005 |

* cited by examiner

DOPED COPPER-II-HYDROXIDE PHOSPHATE, METHOD FOR PRODUCING SAME AND USE THEREOF

CROSS REFERENCE TO RELATED APPLICATIONS

This application is a National Stage of International Application No. PCT/EP2014/073509 filed Nov. 3, 2014, which claims benefit of German Patent Application No. 10 2013 112 387.2 filed Nov. 11, 2013, both of which are herein incorporated by reference in their entirety.

SUBJECT-MATTER OF THE INVENTION

The invention concerns a mixed-metallic phosphate compound containing copper as a main metallic constituent, a method for the production thereof and the use thereof.

BACKGROUND OF THE INVENTION

In the blow moulding of plastic components of thermoplastic polymer, in particular hollow plastic bodies, for example PET bottles, so-called preforms consisting of the polymer material are heated to soften the polymer material and converted into the desired configuration by injecting gas under pressure in a mould. One measure which is frequently used among various possible ways of heating the preform is irradiation with infrared rays (IR). In that case the effectiveness of heating and thus the economy of the method are correspondingly higher, the greater the degree to which the radiation is absorbed by the polymer material and converted into heat. It may therefore be advantageous to add to the polymer material radiation absorbers which improve the radiation absorption of the material.

Materials which act as radiation absorbers in polymer materials are basically known. Problems which however can be involved with providing the polymer material with radiation absorbers are for example the lack of foodstuff compatibility or indeed the toxicity of many materials which are basically suitable as radiation absorbers, which makes them unsuitable for many uses, for example for foodstuff packagings like PET bottles. In addition materials which are basically suitable as radiation absorbers can adversely affect the properties of the polymer material, for example stability, strength and flexibility or also the barrier properties of the polymer material.

A further disadvantage of known materials which act as radiation absorbers in polymer materials is the wavelength range in which the materials can improve radiation absorption. Many radiation absorbers absorb predominantly in the shorter-wavelength IR range like for example copper hydroxide phosphate which has a relatively good absorption in the range of about 800 to 1600 nm with a maximum at about 1200 nm, but not in the longer-wavelength radiation range. When using such radiation absorbers therefore shortwave radiators are to be used, which however are generally more expensive than longer-wavelength radiators. Other radiation absorbers which in turn have good absorption in the longer-wavelength IR range from about 1600 nm and above like for example flake silicates frequently do not have good absorption in the shorter-wavelength IR range. A broader wavelength spectrum for the radiation absorber would be advantageous in order to make better use of the energy of radiators which radiate in a broad wavelength range. In particular absorption in the longer-wavelength IR range from about 1600 nm and above would be advantageous as longer-wavelength radiators are relatively inexpensively available.

In addition many radiation absorbers have an inherent colouring which when the radiation absorber is incorporated is transferred on to the polymer material and/or causes clouding of the polymer material. For example carbon black has very good absorption over the entire range of the IR spectrum, but it also has a high level of absorption in the visible range of the spectrum and thus a very high level of inherent colouring, so that its use is greatly limited.

WO-A-03/033582 describes an agent for the absorption of UV radiation on the basis of mixed cerium and titanium phosphate for incorporation into a polymer material. U.S. Pat. No. 7,258,923 describes multi-layer articles having an innermost layer of a thermoplastic polymer which contains IR-absorbent additives which are selected from borides of the transition metals and lanthanides. U.S. Pat. No. 5,830,568 describes a composite glass with an intermediate layer of PVB or ethyl vinyl acetate copolymer with functional ultra-fine metal oxide particles dispersed therein for light absorption.

Copper(II)hydroxide phosphate which in the literature is also referred to as basic copper phosphate is used as an additive in plastics for various purposes. For example in accordance with DE 3917294 and DE 4136994 it is added to plastics to make them writable by means of laser beams.

The known method of producing copper(II)hydroxide phosphate involves treating basic copper carbonate in aqueous dispersion with at least stoichiometric amounts of phosphoric acid at temperatures below 70° C., further mechanically moving the resulting reaction mixture in the same temperature range, then briefly heating it to boiling temperature and finally separating off the copper(II)hydroxide phosphate. That method is described in DE 3342292. It suffers from various disadvantages. The reaction times are extremely long, up to 12 hours, which is extremely undesirable in terms of production on a large technical scale. In addition $CO_2$ is developed in the method, and that leads to unwanted foaming and problems in terms of working safety.

DE 10 2009 001 335 A1 describes a radiation-absorbent, plastic-based material comprising a polymer matrix with an absorber material which is contained therein and which is selected from phosphates, condensed phosphates, phosphonates, phosphites and mixed hydroxide-phosphate-oxoanions of copper (Cu), tin (Sn), calcium (Ca) and iron (Fe) and is finely distributed, dispersed or dissolved in the polymer matrix, wherein the absorber material can also be a mixture of the above-mentioned substances. Preferred absorber materials are tritin phosphate, tricopper phosphate, copper diphosphate, copper hydroxide phosphate and mixtures thereof. The described material is suitable inter alia as a packaging material for commercial products, in particular foodstuffs, or cosmetic agents, and is intended to absorb UV or IR radiation and to retain light from the visible range of the spectrum not at all or only to a slight degree and to cause as far as possible no unwanted inherent colouration or clouding of the polymer material by virtue of the absorber material.

DE 10 2010 003 366 A1 describes a matrix material of plastic, preferably of thermoplastic material, or lacquer, which contains an additive which makes it possible to trigger foaming of the matrix material by irradiation with laser light or IR light. The additive includes an absorber material which embedded or dissolved in the matrix material absorbs laser light or IR light and causes local heating in the matrix material at the location of irradiation with laser light or IR light, and a blowing agent which upon heating by virtue of the irradiation with laser light or IR light to temperatures above 50° C. produces a gas which foams the matrix material by decomposition, chemical conversion or reaction. In an embodiment the absorber material can be selected from phosphates, condensed phosphates, phosphonates, phosphites and mixed hydroxide-phosphate-oxoanions of various metals, preferably from phosphates of Cu, Sn, Fe, Ni, Mo, Co, Mn or Sb. Copper hydroxide phosphate is particularly preferred.

OBJECT

The object of the invention was to provide a radiation absorber which upon being embedded in a polymer material absorbs in a wavelength range which is wider in comparison with known radiation absorbers and/or which is more suitable for given radiators, which imparts as far as possible no unwanted inherent colouring or clouding to the polymer material, which as far as possible is harmless to health, which enjoys good processability and/or does not significantly detrimentally influence the material properties of the polymer material.

DESCRIPTION OF THE INVENTION

That object is attained by a mixed-metallic phosphate compound which contains as the main metal copper in the divalent oxidation state in a proportion of at least 70.0 at-% and one or more doping metals in a total proportion of the doping metals of at least 0.01 to at most 30.0 at-%, wherein the doping metals are selected from the group consisting of the elements of the first and second main groups and the eighth subgroup of the elements of the periodic table, Al, Sn, Si, Bi, Cr, Mo, Mn, the lanthanides and the actinides, wherein the stated metal proportions relate to the total amount of the metals in the mixed-metallic phosphate compound and wherein the mixed-metallic compound has a phosphate content expressed as $P_2O_5$ in the range of 10 to 60 wt-%.

Surprisingly it has been found that doped copper(II) hydroxide phosphates of the kind according to the invention absorb in a wider wavelength range which is more suitable for certain radiators, in comparison with known radiation absorbers, in particular in relation to pure copper(II)hydroxide phosphate which was known as a radiation absorber and which is used in many applications. When the doped copper (II)hydroxide phosphate of the invention is incorporated into a polymer material it does not impart thereto any unwanted inherent colouration or clouding. Depending on the respective doping metals used it is harmless in terms of health, has good processability and does not significantly adversely influence the material properties of the polymer material, when used in the amounts usually employed. An absorption which is improved over pure copper(II)hydroxide phosphate is achieved by the doping according to the invention, in particular in the wavelength range above 1400 nm, whereby the use as an absorber for radiators can be expanded in a wider wavelength range.

In a preferred embodiment of the invention in the UV-VIS-IR spectrum at at least one wavelength within the wavelength range of over 1400 to 2200 nm the mixed-metallic phosphate compound has an absorption which is at least 50% of the absorption maximum within the wavelength range of 600 to 1400 nm.

The above-mentioned absorption property can be set by the man skilled in the art with knowledge of the invention by the selection and the amounts of doping metals within the ranges according to the invention and can be achieved by a few experiments. The examples specified herein can in that respect serve for the man skilled in the art as a basis for suitable compositions. Absorption maxima of the compositions by way of example can be suitably varied by a variation in the doping metals specified therein, and adapted to the respective requirements involved.

In a further embodiment of the invention the total proportion of the doping metals is in the range of 0.1 to 25.0 at-%, preferably in the range of 0.5 to 20.0 at-%, particularly preferably in the range of 1.0 to 10.0 at-% or in the range of 2.0 to 5.0 at-%. If the total proportion of the doping metals in the mixed-metallic phosphate compound is too low then the improvement to be achieved in absorption in the wavelength range above 1400 nm is only slight. If the total proportion of the doping metals in the mixed-metallic phosphate compound is too high that can have a detrimental effect on overall absorption. A substantial advantage of the doping is that improved absorption can be measured in particular in the wavelength range from 1400 nm and thus the use as an absorber for medium-wave radiators can be expanded.

In a further embodiment of the invention the mixed-metallic phosphate compound contains the main metal copper in the divalent oxidation state in a proportion of at least 80.0 at-%, preferably at least 90.0 at-%, particularly preferably at least 95.0 at-%.

In a further embodiment of the invention the doping metals are selected from the group consisting of Ca, Al, Fe, Sn and Zn. The use of Ca, Al, Fe, Sn and/or Zn as doping metals is advantageous from the physiological point of view as those elements are also used in other formulations, for example in the area of foodstuff additives, and are predominantly harmless in terms of health, for which reason the use thereof is suitable in particular in absorbers for the production of foodstuff packagings.

In a further embodiment of the invention the mixed-metallic phosphate compound has a phosphate content expressed as $P_2O_5$ in the range of 15 to 50 wt-%, preferably in the range of 20 to 40 wt-%.

The invention also concerns a method for producing the mixed-metallic phosphate compound according to the invention as described herein, in which an aqueous dispersion of copper(II)hydroxide and compounds of the doping metals is reacted with an amount of phosphoric acid for a period of 0.1-10 hours at temperatures in the range of 15 to 150° C., wherein the amount of phosphoric acid is so selected that the molar ratio of phosphoric acid $H_3PO_4$ to the total molar amount of main metal (copper) used and doping metals used is greater than 1:1, and the solid product is obtained from the reaction mixture.

Desirably in the method according to the invention the copper(II)hydroxide and the compounds of one or more doping metals are presented in the desired amounts in aqueous dispersion. The phosphoric acid is preferably added in small amounts gradually, for example by dropping, to that aqueous dispersion. In principle the phosphoric acid can be used in any concentration. Highly concentrated acid is advantageously used, like the commercially usual 85% phosphoric acid, to avoid large volumes. Alternatively doping metals can also be introduced into the phosphoric acid solution and added by way thereof to the copper(II)hydroxide dispersion.

The reaction mixture is then heated to boiling for a period, desirably for about 0.5 to 1.5 hours. It is particularly advantageous if operation is effected in two temperature stages, by firstly heating the reaction mixture prior to boiling for a period of about 0.5 to 1.5 hours to a temperature of 20 to 80° C., preferably to a temperature in the region around 50° C., and then, as mentioned above, heating the reaction mixture for example for 0.5 to 1.5 hours, at boiling temperature. In that stage it may possibly suffice to heat it to 80 to 100° C.

Subsequently to the reaction for which usually at most 2 hours are sufficient the reaction mixture is desirably cooled down to a temperature below 30° C., put on to a filter like a membrane filter press, washed, pressed out and blown dry. After that the product can advantageously be further dried to an ignition loss of less than 6% and ground.

In a preferred embodiment of the method according to the invention the compounds of the doping metals are selected from the group consisting of oxides, hydroxides, sulphates, carbonates and hydrogen carbonates of the doping metals including mixed-metallic compounds of the aforesaid. The use of the above-mentioned anions in the compounds of the doping metals is advantageous from the physiological point of view as they are also used in other formulations, for example in the area of foodstuff additives, and are predominantly harmless in terms of health, for which reason the use thereof is suitable in particular in absorbers for the production of foodstuff packagings.

In a further preferred embodiment of the method according to the invention the reaction of the aqueous dispersion with the phosphoric acid is carried out for a period of at most 4 hours, preferably at most 2 hours.

EXAMPLES

Example 1

Various mixed-metallic phosphate compounds according to the invention were produced in accordance with the following reaction system. The amounts used of the starting compounds, the compounds of the doping metals, the reaction times and the reaction temperatures are specified in Table 1 hereinafter. The product yields and the amounts of phosphorus and metals in the products, ascertained by analysis, and specified as the respective oxides, are reproduced in Table 2 hereinafter.

Reaction System

Copper(II)oxide was dispersed in water together with compounds of doping metals (CaO, $Al_2O_3$ and/or $Fe_2O_3$) and 85% phosphoric acid, specified herein in grams of $P_2O_5$, was gradually added to the aqueous dispersion. The reaction mixture was heated to a temperature T for a period t, then cooled down to below 30° C. and put on to a membrane filter press. The filter cake was briefly subsequently washed once with water, pressed out, blown dry and then dried to an ignition loss of less than 6% and ground.

TABLE 1

| Ex. No. | CuO [g] | CaO [g] | $Al_2O_3$ [g] | $Fe_2O_3$ [g] | $H_2O$ [ml] | $P_2O_5$ [g] | Time t [h] | Temp. T [° C.] |
|---|---|---|---|---|---|---|---|---|
| 1 | 81.5 | 57.5 | — | — | 9000 | 87 | 1 | 95 |
| 2 | 147.0 | 11.5 | — | — | 8500 | 87 | 1 | 95 |
| 3 | 155.0 | 6.0 | 0.3 | 0.2 | 7000 | 87 | 1 | 98 |
| 4 | 161.5 | 1.0 | — | — | 5000 | 87 | 1 | 92 |
| 5 | 81.5 | — | 78.5 | — | 9000 | 87 | 1 | 95 |
| 6 | 130.5 | — | — | 16.5 | 8600 | 87 | 1 | 93 |
| 7 | 130.5 | 0.1 | — | 16.4 | 8600 | 87 | 1 | 93 |

TABLE 2

| Ex. No. | Yield [%] | $P_2O_5$ [wt-%] | CuO [wt-%] | CaO [wt-%] | $Al_2O_3$ [wt-%] | $Fe_2O_3$ [wt-%] |
|---|---|---|---|---|---|---|
| 1 | 96 | 38.5 | 36.0 | 25.5 | — | — |
| 2 | 95 | 35.4 | 59.9 | 4.7 | — | — |
| 3 | 96 | 35.0 | 62.4 | 2.4 | 0.1 | 0.1 |
| 4 | 97 | 34.9 | 64.7 | 0.4 | — | — |
| 5 | 96 | 35.2 | 33.0 | — | 31.8 | — |
| 6 | 98 | 37.1 | 55.8 | — | — | 7.1 |
| 7 | 98 | 37.1 | 55.8 | 0.04 | — | 7.1 |

Heating Experiments and Absorption

Mixed-metallic phosphate compound according to the invention was finely ground and then processed to give a granular material by means of an extruder in contents of 2 wt-% and 6 wt-% in low density polyethylene (LD-PE: product Lupolen 1800S from Lyondell Basell, Netherlands). Plate-shaped sample bodies (4 cm×3 cm×0.2 cm) were produced from the granular materials by means of an automatic injection moulding machine (type Babyplast from Christmann Kunststofftechnik GmbH, Kierspe, Germany).

For comparison purposes, corresponding sample bodies were produced from pure LD-PE without additive for determining a blank value and sample bodies with 2 wt-% and 6 wt-% of pure copper hydroxide phosphate ($Cu_2(OH)PO_4$; KHP; Chemische Fabrik Budenheim KG) were produced.

The plate-shaped sample bodies were irradiated perpendicularly to the plane of the plate with a commercially usual infrared lamp (100 watts nominal output) at a spacing of 20 cm from the plate surface and the temperature of the irradiated surface was contact-lessly measured by means of an IR thermometer over the irradiation time of 15 minutes.

The results of the temperature measurements with the mixed-metallic phosphate compound according to the invention in accordance with Example No 6 (FGV 15) and with pure copper hydroxide phosphate (KHP) are reproduced in FIG. 1.

The sample bodies with the additions of phosphate compounds, in comparison with the blank sample without addition, exhibit markedly higher heating speeds and overall higher temperatures are reached in the sample bodies with the additions of phosphate compounds. With the same concentrations of the phosphate compounds (2 wt-% and 6 wt-% respectively) the sample bodies with the mixed-metallic phosphate compound according to the invention (FGV 15) also involve higher heating speeds and in total higher temperatures reached, in comparison with the sample bodies with pure copper hydroxide phosphate (KHP).

Figure 2:
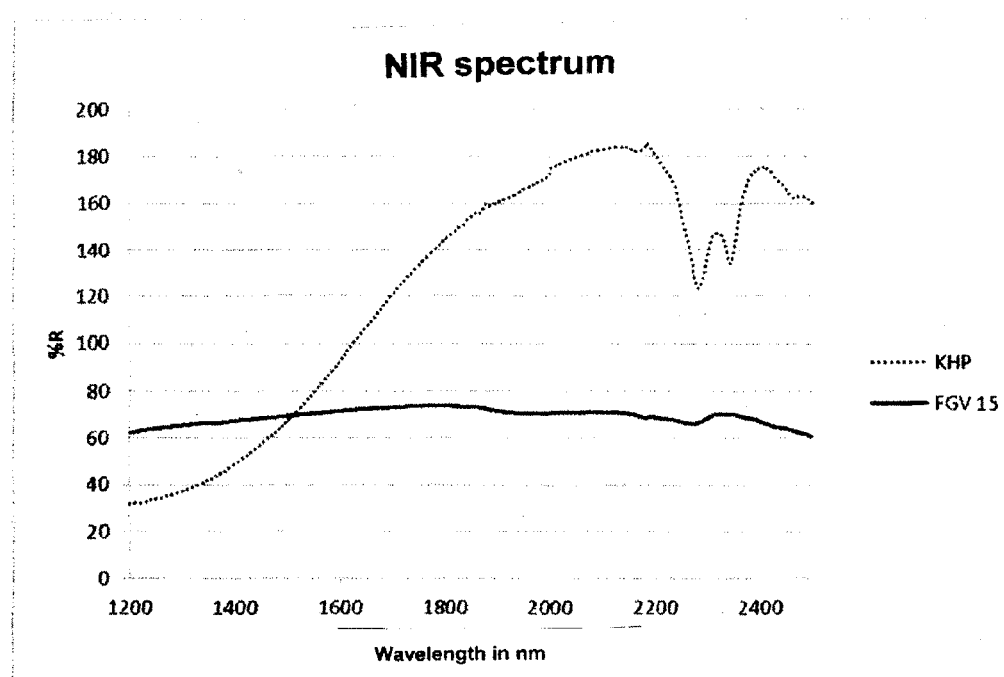

FIG. 2 shows the NIR spectrum of the mixed-metallic phosphate compound according to the invention (FGV 15) used in the heating tests, in comparison with pure copper hydroxide phosphate (KHP) over the wavelength range of 1200 to 2500 nm. The percentage reflection (% R) is plotted on the ordinate. The lower the percentage reflection the correspondingly greater is the absorption. It can be clearly seen that the mixed-metallic phosphate compound (FGV 15) according to the invention exhibits strong absorption over almost the entire wavelength range whereas the pure copper hydroxide phosphate (KHP) has good absorption only up to about 1600 nm, but the absorption in the longer-wavelength radiation range from 1600 nm to 2500 nm falls markedly.

Therefore the mixed-metallic phosphate compound according to the invention, in comparison with pure copper hydroxide phosphate, can be used markedly more effectively as a radiation absorber using comparatively inexpensive longer-wavelength radiators or radiators which cover a wide wavelength range.

The invention claimed is:

1. A mixed-metallic phosphate compound which contains:
   a main metal, the main metal being copper in the divalent oxidation state in a proportion of at least 90.0 at-%; and
   one or more doping metals in a total proportion of the doping metals of at least 0.01 to at most 10.0 at-%,
   wherein the doping metals are selected from the group consisting of elements of first and second main groups and eighth subgroup of the elements of the periodic table, Al, Sn, Si, Bi, Cr, Mo, Mn, and lanthanides,
   wherein the stated metal proportions relate to the total amount of the metals in the mixed-metallic phosphate compound and wherein the mixed-metallic compound has a phosphate content expressed as $P_2O_5$ in the range of 10 to 60 wt-%.

2. The mixed-metallic phosphate compound according to claim 1, wherein, in the UV-VIS-IR spectrum at one or more wavelengths within the wavelength range of 1400 to 2200 nm, said phosphate compound has an absorption which is at least 50% of the absorption maximum within the wavelength range of 600 to 1400 nm.

3. The mixed-metallic phosphate compound according to claim 1, wherein the total proportion of the doping metals is in the range of 0.1 to 10.0 at-%.

4. The mixed-metallic phosphate compound according to claim 1, wherein said phosphate compound contains the main metal copper in the divalent oxidation state in a proportion of at least 95.0 at-%.

5. The mixed-metallic phosphate compound according to claim 1, wherein the doping metals are selected from the group consisting of Ca, Al, Fe, Sn and Zn.

6. The mixed-metallic phosphate compound according to claim 1, wherein said phosphate compound has a phosphate content expressed as $P_2O_5$ in the range of 15 to 50 wt-%.

7. A method for producing said mixed-metallic phosphate compound according to claim 1, comprising:

reacting an aqueous dispersion of copper(II)hydroxide and compounds of the doping metals with an amount of phosphoric acid for a period of 0.1-10 hours at temperatures in the range of 15 to 150° C., wherein the amount of phosphoric acid is so selected that a molar ratio of phosphoric acid $H_3PO_4$ to the total molar amount of main metal copper used and doping metals used is greater than 1:1, and
a solid product is obtained from the reaction mixture.

8. The method according to claim 7, wherein the compounds of the doping metals are selected from the group consisting of oxides, hydroxides, sulphates, carbonates and hydrogen carbonates of the doping metals including mixed-metallic compounds of the aforesaid.

9. The method according to claim 7, wherein the reaction of the aqueous dispersion with the phosphoric acid is carried out for a period of at most 4 hours.

10. A method of using said mixed-metallic phosphate compound according to claim 1, comprising producing preforms of thermoplastic polymer which can be used in blow moulding methods for producing hollow polymer bodies by heating the preform under the action of radiation, wherein said mixed-metallic phosphate compound or a mixture of said mixed-metallic phosphate compounds is finely distributed, dispersed or dissolved in an amount of 0.0005 to 10 wt-% in the thermoplastic polymer.

11. A method of using said mixed-metallic phosphate compound according to claim 1, comprising laser welding plastic articles of thermoplastic polymer comprising a radiation absorber, wherein said mixed-metallic phosphate compound or a mixture of said mixed-metallic phosphate compounds is finely distributed, dispersed or dissolved in an amount of 0.01 to 5 wt-% in the thermoplastic polymer as said radiation absorber.

* * * * *